United States Patent

Ingerman et al.

(10) Patent No.: US 9,239,239 B2
(45) Date of Patent: Jan. 19, 2016

(54) GEOGRAPHIC COORDINATES CODING SOFTWARE PRODUCT

(71) Applicants: David B Ingerman, Summit, NJ (US);
Jude X. Huang, Millburn, NJ (US);
Richard Earle Seeger, III, Pacifica, CA (US)

(72) Inventors: David B Ingerman, Summit, NJ (US);
Jude X. Huang, Millburn, NJ (US);
Richard Earle Seeger, III, Pacifica, CA (US)

(73) Assignee: Place Codes, Inc., Summit, NJ (US)

( * ) Notice: Subject to any disclaimer, the term of this patent is extended or adjusted under 35 U.S.C. 154(b) by 0 days.

(21) Appl. No.: 14/673,496

(22) Filed: Mar. 30, 2015

(65) Prior Publication Data

US 2015/0211861 A1 Jul. 30, 2015

Related U.S. Application Data

(63) Continuation-in-part of application No. 14/010,837, filed on Aug. 27, 2013, now Pat. No. 8,996,299.

(51) Int. Cl.
| G01C 21/00 | (2006.01) |
| G06K 9/18 | (2006.01) |
| G06F 17/30 | (2006.01) |
| G01S 19/13 | (2010.01) |
| H04W 4/02 | (2009.01) |

(52) U.S. Cl.
CPC ............... *G01C 21/00* (2013.01); *G01S 19/13* (2013.01); *G06F 17/30244* (2013.01); *G06K 9/18* (2013.01); *H04W 4/02* (2013.01)

(58) Field of Classification Search
CPC ......... G01C 21/00; H04W 4/02; G01S 19/13; G06K 9/18; G06F 17/30244
USPC ........................................................... 701/409
See application file for complete search history.

(56) References Cited

U.S. PATENT DOCUMENTS

| 6,356,834 B2 * | 3/2002 | Hancock | G01C 21/20 701/400 |
| 8,624,725 B1 * | 1/2014 | MacGregor | H04W 4/028 340/539.13 |
| 2009/0198954 A1 * | 8/2009 | Sanders | G06F 17/30241 711/212 |
| 2010/0318680 A1 * | 12/2010 | Daniel | G01C 21/32 709/245 |
| 2011/0074629 A1 * | 3/2011 | Khan | G01S 19/25 342/357.64 |
| 2011/0306323 A1 * | 12/2011 | Do | G01C 21/20 455/414.1 |
| 2013/0103608 A1 * | 4/2013 | Scipioni | G06Q 30/02 705/346 |

* cited by examiner

*Primary Examiner* — Mary Cheung
*Assistant Examiner* — Anne Mazzara
(74) *Attorney, Agent, or Firm* — Lawson-Persson & Weldon-Francke P.C.; Catherine Napjus; Michael Persson

(57) ABSTRACT

A software product for easy-to-use naming, coding, and sharing of locations, including those with no addresses.

21 Claims, 4 Drawing Sheets

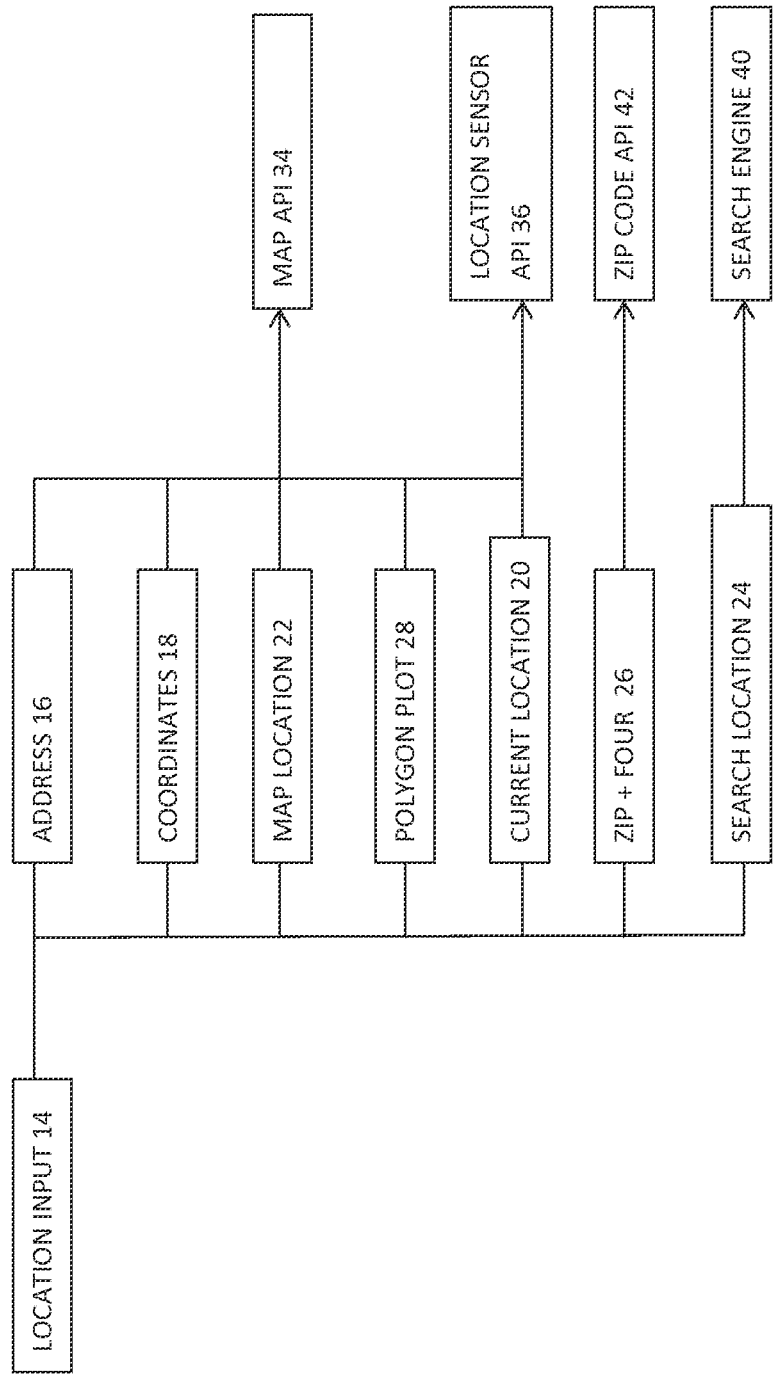

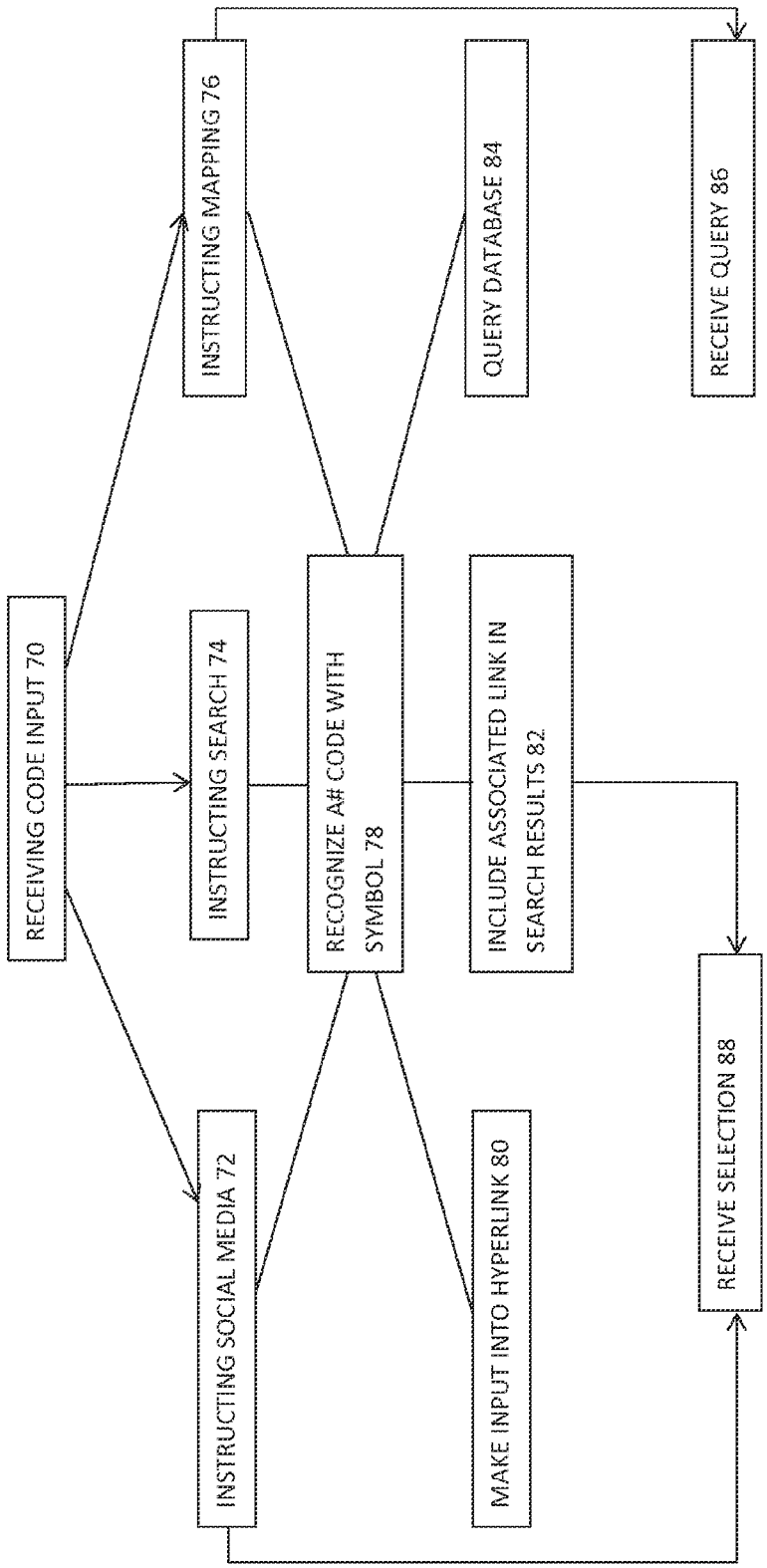

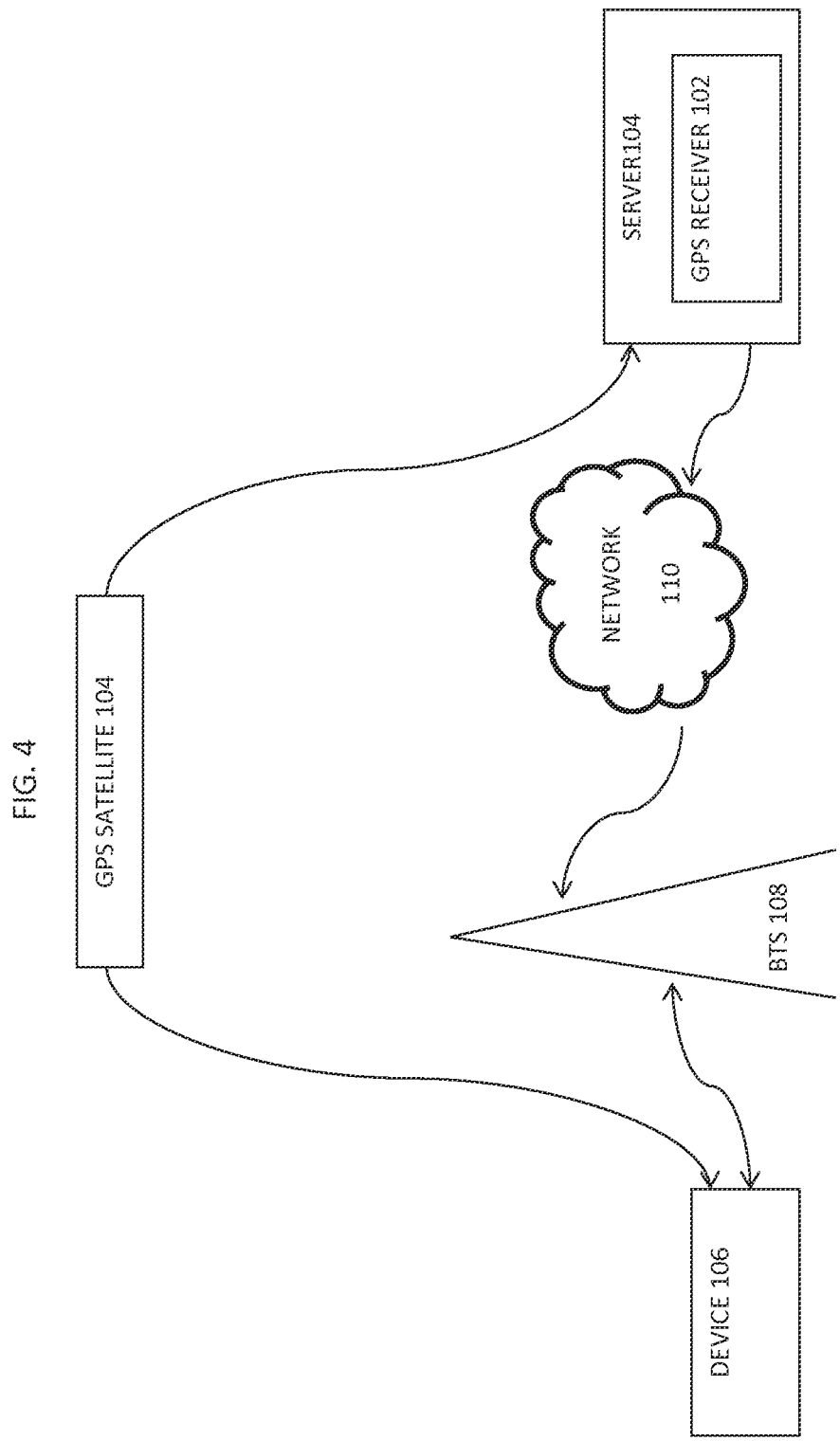

GEOGRAPHIC COORDINATES CODING SOFTWARE PRODUCT

CLAIM OF PRIORITY

This application is a continuation in part of U.S. patent application Ser. No. 14/010,837 filed on Aug. 27, 2013, which claims the benefit of priority of U.S. Provisional Patent Application Ser. No. 61/693,636, filed on Aug. 27, 2012.

FIELD OF THE INVENTION

The present invention relates generally to coding geographic coordinates, and in particular, to identifying specific places by easy-to-remember and easy-to-use codes, rather than other, unwieldy means of location identification.

BACKGROUND

Once used solely as classified military technology, the use of global positioning systems (GPS) is now widely used in the general populous. Devices, such as Garmin® devices, may be used in cars to direct the driver based on their global position and their desired destination. Alternatively, cars frequently include built-in navigation systems that offer similar services. Smartphones also commonly include basic GPS capabilities for locating the user and directing him or her to a desired destination. Other smartphone applications, such as RunKeeper® for example, use the smartphone's GPS capabilities to track the user's path, speed, elevation, etc. . . . . Despite this broad usage of GPS technology, the problem that location identification can be unwieldy and imprecise remains.

There are several common ways to identify a location. Longitude and latitude coordinates may be extremely precise, but are extremely unwieldy to relay to a GPS device or another person. One might tell a friend to meet him at specific GPS coordinates, which may precisely indicate one's location, but the long strings of numbers are neither easily remembered, nor communicated, nor entered into a device with GPS capabilities. Physical addresses are another common way to identify a location. Again, remembering, communicating, and/or entering addresses can be difficult at times, especially when the address is long—1327 Foothill Boulevard, La Canada Flintridge, Calif., for example. Moreover, some addresses are ambiguous and are not easily input into a GPS device. For an address such as, 1454 US RTE 22 West, Union, N.J., for example, a GPS device might not recognize the input of "Route 22" or "Rte. 22," but may, unbeknownst to the user, instead require "US RTE 22" exactly in order to recognize the address. Finally, locations may be identified informally, such as "soccer field #3," "parking lot B," "the East side entrance to the Central Park reservoir," or "the dragon ride at Alpha Amusement Park." Such informal location identifications that don't necessarily have an address are particularly prone to confusion and miscommunication. All of these types of locations and others may need to be communicated from time to time, and all have their disadvantages as far as simple, precise location communication.

Google™ Place Pages provides a service where a business may be provided with a QR code associated with that the business. One who scans such a QR code is provided with information about the business and an option to click for maps or directions to that location. Although a useful tool, this service does not appear to accept input of locations other than addresses, nor does it provide simple process to simply scan for directions, and as such, does not address many of the situations outlined above.

Therefore there is a need for easy assignation and communication of precise coordinates of a specific location.

SUMMARY OF THE INVENTION

The present invention is a software product and smartphone application for easy-to-use coding of locations and accurate transmittal of such codes to devices that can use them. The inventor's co-pending U.S. patent application Ser. No. 14/010,818, which discloses and claims related subject matter is hereby incorporated by reference.

The location identification software product of the present invention takes a physical location as an input and creates a code specific to that location. The software product is tangibly stored on a non-transitory storage device and causes a data processing device to perform the various operations described herein. Many of the operations involve receiving or transmitting various data. The main data processing device may be receiving or transmitting data from any device capable of transmitting data to and receiving data from the data processing device. Any internet-capable device, such as a desktop computer, laptop computer, tablet computer, or smartphone, for example, may communicate with the main data processing device of the present invention. Information received by the data processing device may therefore be typed, scanned, spoken, tapped, clicked, or otherwise selected or input for transmission to the main data processing device. Some operations are performed by a central server, which is the main data processing device. Some operations are performed according to software downloaded from the central server to the device in communication with the server, such as a smartphone application downloaded to a smartphone. With such latter operations, any information transmitted from or received by the device through the software downloaded on the device is still transmitted to or received by the server even if some of the functions are being performed locally by the device. For such operations, the device on which the software downloaded from the central server and the central server are both data processing devices of the present invention.

The location identification software product includes code creation software code, code saving software code, a database, code sharing software code, code selection software code, directions software code, and payment software code. Creation software code creates the code that is associated with the physical location. Code creation software code includes location input software code, automated code provision software code, code customization software code, customized code acceptability software code, note addition software code, and public/private option software code. Location input software code allows for the input of the location to be coded. A location may be inputted by several means including typing an address, typing GPS coordinates, using the user's current location, selecting a map location, searching for a location using a search engine, typing a zip code+four, or plotting polygon points on a map to select an area rather than a point. Location input by selecting a map location or plotting polygon points is accomplished using an electronic map. These options include choices for selecting locations that have no street address, such as a spot on a hiking trail, on a beach or in a park. An electronic map is a computerized depiction of a map where a user may select locations within the map.

In addition, several locations may be input for association with a single code, or "master code." In this case, the location input would be a set of at least two locations. For example, a chain restaurant may input all of its restaurant locations by providing a list of their GPS-coordinates or addresses. Then, when the location of a user is provided, usually through the user's GPS-enabled device, the location or locations nearest to the user may be provided in ascending order of distance from the user, or only the closest location or all of the locations may be provided. Alternatively, several locations may be input for association with a separate code for each location. In the case of alphanumeric codes, the user may input a template for the codes such that while each code is distinct, each follows a certain pattern or set of rules. For example, six locations may be input for association with six separate codes, along with a template that all the codes be in the form of BRAVO#, where # is a number. Assuming BRAVO1, BRAVO2, BRAVO3, BRAVO4, BRAVO5, and BRAVO6 are all available, these may be the codes associated with the six locations in accordance with the template.

The location input may also refer to one or more locations where a product or service is available for purchase. Again, where the locations of the product are eventually provided to a user, the location or locations of the product nearest to the user may be provided in ascending order of distance from the user or the closest or all of the locations of the product may be provided. Hereinafter, when referring to "products" in this context, it is understood that the product may be a good or service. For example, the owner of a specific brand of vodka may input all of the locations where that vodka is available for purchase. In preferred embodiments of the system, such locations would be updated in real time on that a location that has run out of the specific product would no longer be encoded and a new location that has brought the product into stock will be encoded even if it was not included during the initial code creation.

Once the location is inputted, automated code provision software code is executed. Automated code provision software code provides the user with a code associated with the inputted location. The code is alphanumeric, and may also be displayed optionally as a QR code or bar code. The code is easily speakable into a device that accepts spoken commands. The user may then choose to execute code customization software code to choose a different alphanumeric code for the inputted location other than the one automatically generated by automated code provision software code. The user would do this by inputting a preferred alphanumeric grouping. If code customization software code is executed by the input of a requested customized code, customized code acceptability software code is also executed. Customized code acceptability software code checks for availability of the requested preferred alphanumeric grouping against a list of non-available alphanumeric codes. For example, if a restaurant owner wants to code his location "OriginalRays," he can check to see if that code is available. Alphanumeric codes may be non-available either because they are already used as a code for another location or because they have been reserved. Codes may be reserved for several reasons. A code containing a very desirable word err generic term, "pizza" for example, may be reserved for users willing to pay to lave a code with that word. Codes containing trademarks or domain names may also be reserved. Customized code acceptability software code also checks acceptability of the requested preferred alphanumeric grouping as far as rules for the code. Rules may be as simple as: the alphanumeric code must include at least one letter or number. More complex rules may be that the alphanumeric code must be at least eight characters long and include at least one letter, one number, and one symbol.

In some embodiments, the location input is not associated with an alphanumeric code, QR code, or bar code, but with a logo. In such embodiments, a logo input is provided along with the location input. The availability of the logo input may be verified before being associated with the location. For example, the logo may be checked against trademark databases, such as the USPTO, international, or U.S. state trademark databases, or an image search, such as by using a service such as those marketed under the trademark GOOGLE IMAGES or GOOGLE GOGGLES, to verify that the entity providing the logo input and location input is the owner of the logo. Alternatively, the verification process may be by requiring the entity to provide sufficient evidence of ownership of the logo. Beyond this, the logo input acts the same as a QR code, as described herein. Any additional functionality disclosed herein or inventor's co-pending U.S. patent application Ser. No. 14/010,818 that is applicable to QR codes is also applicable to the logo input codes.

As used herein, "logo" or "logo input" refers not only to registerable logo trademarks, but to any images associated with a product, service, business, or location. Using APPLE computers as an example, therefore, the logo input may be a traditional logo trademark, such as an apple symbol for APPLE computers. It may also be a scan of the word trademark "APPLE." It may be a photograph or other image of an APPLE computer or product. It may be a video or still image from a television commercial for APPLE computers. It may be an image of an APPLE store. It may also be a scan of a print advertisement for APPLE computers. This may include, for example, photos taken of advertisements in magazines from several angles and/or in different lighting so that the advertisement is recognizable despite such variations. This list is not inclusive. One of at least ordinary skill in the art will recognize that there are many examples of logo inputs that could be used as described in the present invention. The step of receiving a logo input, which is an operation that the software product of the present invention causes a data processing device to perform, therefore may take several forms. APPLE computers may provide a set of several images that are the logo input. APPLE computers may provide one image that is the logo input. Especially with this latter embodiment, but with any embodiment, it is preferred that an additional step of searching and storing additional images or video associated with the logo input is performed. As used in this context, hereinafter, it is understood that "image" may refer to an image or a moving image or video. An image will be considered "associated with the logo input" if, for example: it is a trademark or other indicator of a common source with the logo input; it is advertising or marketing material for, referring to, or depicting a common product service, company, or source as the logo input; or it is an image of the location indicated in the location input. It is understood that the logo input may also be provided by a source other than the source of materials that make up the logo input. For example, a system operator may input a collection of APPLE logo inputs, as a means of demonstrating the system to APPLE.

The software product of the present invention also causes the data processing device to receive scanned images. It is preferred that the software product also cause the data processing device to analyze received scans to determine that the scanned image or video is sufficiently similar to a logo input stored within the database to identify it as such. As explained above, with the preferred embodiment, the logo input stored in the database will include several images, including, for example, the same image photographed at different angles and/or in different lighting, so that such a logo input is easily identifiable as a specific advertisement or other image when compared with a scanned image. It is also preferred that, should it be determined that a received scan is not sufficiently similar to a stored logo input within the database, a source of the received scan is identified, contacted, and invited to use the software product of the present invention. It is preferred that if any such sources do then use the software product, that they are charged for such use.

The location identification software product of the present invention also includes pairing an alphanumeric code created by the software product with a symbol. This pairing is akin to the use of a hashtag or "#" symbol in association with the service marketed under at least the trademark TWITTER, as of this writing. When used, the symbol preferably immediately precedes the alphanumeric code, but may also immediately succeed the alphanumeric code or be imbedded within the code. As used herein, to say that the symbol is "proximate" to the alphanumeric code is to say that the symbol either immediately precedes or succeeds the alphanumeric code or that it is embedded within the code. For the avoidance of doubt, in this latter embodiment where the symbol is embedded within the code, although the symbol interrupts the string of characters that is the alphanumeric code, the alphanumeric code is still recognizable independent of the symbol. The symbol is singularly associated with the system that runs the software product of the present invention. That is to say, that any currently commonly used or future comparable online search, mapping, and/or social media technologies will, upon detecting the presence of the symbol within the string containing the symbol and the alphanumeric code, immediately recognize the alphanumeric code as being associated with the software of the present invention and the system that runs the software of the present invention. The online search, mapping, and/or social media technology, upon such recognition will query the database of the software product regarding the alphanumeric code and the database will resolve the query.

As used herein, the terms "online search technologies," "online mapping technologies," and "online social media technologies," are understood to have their common meanings. That is to say, "online search technologies" are those technologies, including websites, mobile phone applications, and other devices, and the hardware and software necessary to operate and present websites, mobile phone applications, and devices, that receive a user inputted search query and provide the user with a result set of links to other sources, such as websites, that respond to the search query. Current common online search technologies include those marketed under the trademarks GOOGLE, YAHOO!, and BING. It is understood that these are merely examples of online search technologies and that this list is not inclusive of all online search technologies as contemplated herein. "Online mapping technologies" are those technologies, including websites, mobile phone applications, and other devices, and the hardware and software necessary to operate and present websites, mobile phone applications, and devices, that receive location inputs and provide location information related to those location inputs, such as physical addresses, maps of, and directions from or to the locations. Current common online mapping technologies include those marketed under the trademarks GOOGLE MAPS, YAHOO! MAPS, BING MAPS, and MAPQUEST. It is understood that these are merely examples of online mapping technologies and this list is not inclusive of all online mapping technologies as contemplated herein. It is further understood that online search technologies and online mapping technologies may be used in combination with one another. For example, a user may input a landmark as a search query into an online search technology, and the online search technology may return a result set including a link to a an online mapping technology that may include an address and map of the landmark. "Online social media technologies" are those technologies, including websites, mobile phone applications, and other devices, and the hardware and software necessary to operate and present websites, mobile phone applications, and devices, that allow users to create, share, or exchange information, ideas, and photographs/videos in virtual communities and networks. Current common online social media technologies include those marketed under the trademarks TWITTER, FACEBOOK, FRIENDSTER, MYSPACE, and GOOGLE+. It is understood that these are merely examples of online social media technologies and this list is not inclusive of all online social media technologies as contemplated herein. And again, it is further understood that online social media technologies may be used in combination. For example, an online social media technology user may post a link to an address, which, once selected opens in an online mapping technology website. As another example, an online search technology user may input a search query in whose result set is included a link to an online social media technology page.

The present invention includes software that causes a data processing device to perform operations, including the operation of receiving an alphanumeric code input into a GPS-enabled device. With the use of the symbol, this operation includes several steps. These steps may include sending online social media technologies instructions to recognize an input including the alphanumeric code and the symbol proximate to the alphanumeric code and make that input to a hyperlink associated with the database of the non-transitory storage device, and then receiving a selection of the hyperlink. An input into an online social media technology may be any of the information created, shared, or exchanged in the virtual communities and networks. For example, an online social media technology input may be something posted to a user's FACEBOOK page or included in a user's TWITTER feed. To say that the hyperlink is "associated" with the database may mean that the hyperlink is linked directly to the portion of the database including the location associated with the alphanumeric code; that the hyperlink is linked to the database or non-transitory storage device generally and selection of the hyperlink constitutes a query of the database or non-transitory storage device for the location associated with the alphanumeric code; that the hyperlink is linked to a website rendering of the location associated with the alphanumeric code provided by the database; that the hyperlink has an access path to the database or non-transitory storage device such that the location associated with the alphanumeric code will be provided to one who selects the hyperlink; etc. A "selection" of the hyperlink may be by any commonly known means in the art, such as by clicking the hyperlink with a mouse, tapping the hyperlink on a touch-sensitive screen of a device, using a voice command to select the hyperlink, etc. . . . . By way of example only, in this discussion, let us assume the symbol used with alphanumeric codes in the present invention is: ⌐ . It is understood that this symbol is merely exemplary and the symbol in question may be any of many symbols, both those commonly known and those that may be invented for this purpose by the inventors. As an example of the present invention, a FACEBOOK user may include on her page, "just had an awesome ⌐ McRib!" The software product of the present invention will have sent FACEBOOK an instruction to recognize the combination of the alphanumeric code with the symbol and turn the combination into a hyperlink. Someone reading the user's FACEBOOK page may now click on that hyperlink. The instructions to FACEBOOK and this selection comprise the steps included in the more general step of receiving an alphanumeric code. Assuming the alphanumeric code "mcrib" has been associated with the location of those McDonalds® restaurants that carry McRib® sandwiches, the software product will go on to cause the data processing device to provide the location of the nearest one or more McDonalds® restaurant(s) that carries McRib® sandwiches to the selector of the hyperlink and perform the other operations detailed above.

The several steps for of receiving an alphanumeric code input may also include instructing online search technologies to recognize the symbol/alphanumeric code combination in a search query and include a link (preferably the first link) associated with the database in the result set for that search query, and then receiving a selection of that link would then complete the step of receiving an alphanumeric code input. The terms "associated" (with the database) and "selection" of the link are as described above with respect to hyperlinks with online social media technologies. As an example of the present invention, a user may submit the following search query into the YAHOO! search engine: "Walmart⬚." YAHOO! would have been instructed to recognize the alphanumeric code and symbol combination in the search query and include a link associated with the database within the result set for that search query. The user may now select that link from the result set. The instructions to YAHOO! and this selection comprise the steps included in the more general step of receiving an alphanumeric code. Assuming the alphanumeric code "walmart" has been associated with the locations of Walmart® stores, the software product will go on to cause the data processing device to provide the location of the nearest or nearest few Walmart® stores to the selector of the hyperlink and perform the other operations detailed above.

The several steps for of receiving an alphanumeric code input may also include instructing online mapping technologies to recognize the alphanumeric code/symbol combination and query the database for the location associated with the alphanumeric code, and then receiving the query from the online mapping technology. The query from the online mapping technology is any type of request, commonly used in the art, from the online mapping technology to the database to receive the location. As an example of the present invention, a user may enter into MAPQUEST, instead of an address, the following input: "star⬚ bucks." MAPQUEST would have been instructed to recognize the alphanumeric code and symbol combination and automatically query the database upon this recognition. The instructions to MAPQUEST and the reception of the query comprise the steps included in the more general step of receiving an alphanumeric code. Assuming the alphanumeric code "starbucks" has been associated with locations of Starbucks® stores, the software product will go on to cause the data processing device to provide the location of the nearest or nearest few Starbucks® stores to the user and perform the other operations detailed above. It is understood that in such an embodiment of the present invention, MAPQUEST, acting as the map API, as discussed below may perform some or all of the remainder of the operations.

The functionality including the alphanumeric code/symbol combination as described above may be combined with any other software functionality disclosed herein or in the inventor's co-pending U.S. patent application Ser. No. 14/010,818.

Once a user has been provided with an acceptable code, the user may input notes associated with the code or the location it represents through note addition software code. Public/private option software code may also be executed, which allows a user to choose whether the code will be public or private.

The location identification software product also includes saving software code, the database, and code sharing software code. Saving software code is executed to save putted location information, any codes subsequently associated with that location, any notes associated with the code and location, and whether the code and any notes are public or private. All of this information saved through saving software code is saved in the database. Code sharing software code allows a user to share the code through various means, such as email, social media, texting, website posting, or sound recording. Message customization software code may also be executed as a part of code sharing software code to customize a message or post included with the code.

The location identification software product also includes code selection software code, directions software code, and payment software code. Code selection software code allows the recipient of a code shared through code sharing software code to select the shared code and learn the location associated with the shared code and any other information attached to the code, such as notes. Once the recipient has selected the shared code and been presented with the information, he may choose to execute the directions software code, which will provide the recipient with directions to the coded location from the recipient's location or from another location provided by the recipient. If directions are to be provided from the recipient's location, the recipient's device must be GPS-enabled. GPS-enablement is not necessary if the directions are to be provided from another location input into the recipient's device. Directions software code may also provide reverse directions from the coded location to the recipient's location or to another location provided by the recipient.

Payment software code allows for users to pay for the execution of code creation software code. One of ordinary skill in the art will recognize that there are many different payment structures for such a service as described above. Each of these variations is considered to be within the scope of the present invention. It is preferred, however, that code creation be free for both consumers and businesses for non-premium names. Premium code names or generic terms, such as those including desirable words like "pizza," "coffee," "gas," or "lawyer" may be reserved and only assigned to a location upon payment. Such premium code names may be akin to domain names, such as "wine.com", "lawyers.com", or "books.com." Premium code names may also include trademarks and trade names. Premium code names are stored in the database and are only released for assignment upon execution of payment software code.

One of ordinary skill in the art will recognize that the location identification software product and its features may be executed by any device having internet capabilities, including desktop, laptop, and tablet computers, as well as smartphones, which are mobile phones having computer capabilities beyond telephonic capabilities, especially including internet capabilities. It is preferable that the device also include GPS capabilities for improved accuracy.

Although not all features described herein are claimed, it is understood that the inventor considers each feature described herein to be a part of the invention.

The software product and smartphone application of the present invention may be used to great advantage in many scenarios. In a first case, with the current state of the art, a soccer coach might send the following long and convoluted message to the parents of his players:

This week's game is at Veteran's Field #3 in Lake Hopatcong, N.J. Depending on your GPS, you should be able to just enter 126 East Flora Road, Lake Hopatcong, N.J. 07843, which appears to be the nearest street address, but I'm not sure where the entrance is. Their coach said to park in parking lot B which is the closest lot to our field. I found directions on the team's website, which say: Take I-80 to exit 28 or Route 46 to Route 631 Northbound to traffic light turn left onto Lakeside. Follow Lakeside several miles up through two lights. Turn left onto Brooklyn-Stanhope Road for just under a mile (stone house on the corner of Flora and Brooklyn-Stanhope). Turn right onto Flora. Follow Flora—Fields are located on the left side of Flora.

In preparation for the day of the game, the parent searches for the field; reviews the map to try to find field #3 or lot B; gives up and enters 41 characters of a nearby address into a GPS device, "126 East Flora Road, Lake Hopatcong, N.J."; arrives at that nearby address; and searches for the field and parking lot once there.

With the present invention, the coach would send: This week's game is at Veteran's Field #3 in Hopatcong, N.J. Use Code NJVetFieldB. The notes attached to this code would include that Parking Lot B is next to the field. The parent would enter the 11 characters of NJVetFieldB into a GPS device and be directed directly to the field and parking lot. As this example shows, a great deal of time, effort, confusion, and frustration may be saved using the present invention.

In a second case, the user needs to get to a specific part of a large complex. Specifically, he needs to get to the Princeton University Pool. In the current state of the art, he goes online and searches for "Princeton University Pool." He clicks on several search results before coming upon an actual address or map of the university. With the present invention, a Princeton student or facility manager may have created a code, "TigersPool" and made the code public and therefore searchable. The user searches for the code, easily finds it, and is provided with perfect directions to the pool.

In a final case, a user is shopping online. In the current state of the art, he needs to enter multiple address fields each time he visits a new e-commerce site. He is uncomfortable sharing his personal information, including his home address, with these new unknown sites. With the present invention, the user can enter his address once to create a code for it. He can then use this code with participating e-commerce websites in the future, thereby saving the repeated typing in of his address, and preserving his privacy by not disclosing his actual address, but only the code associated with it.

Therefore it is an aspect of the present invention to provide short, memorable codes for a location.

It is a further aspect of the present invention to make these codes public or private.

It is a further aspect of the present invention to obfuscate an actual address associated with the encoded location.

It is a further aspect of the present invention to code a location that does not have an address.

It is a further aspect of the present invention to automatically provide speakable codes.

It is a further aspect of the present invention to allow for customization of the automatically provided codes.

It is a further aspect of the present invention to provide a fully integrated process enabling a user to specify an exact location, name it, and communicate it.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 2 is a block diagram detailing the functionality of the location input function of the software product of the present invention.

FIG. 3 is a block diagram showing detailing the functionality of the symbol plus alphanumeric code function.

FIG. 4 is a diagram showing communication between the various components that perform the functions of the software product of the present invention.

DETAILED DESCRIPTION

Figure 1:
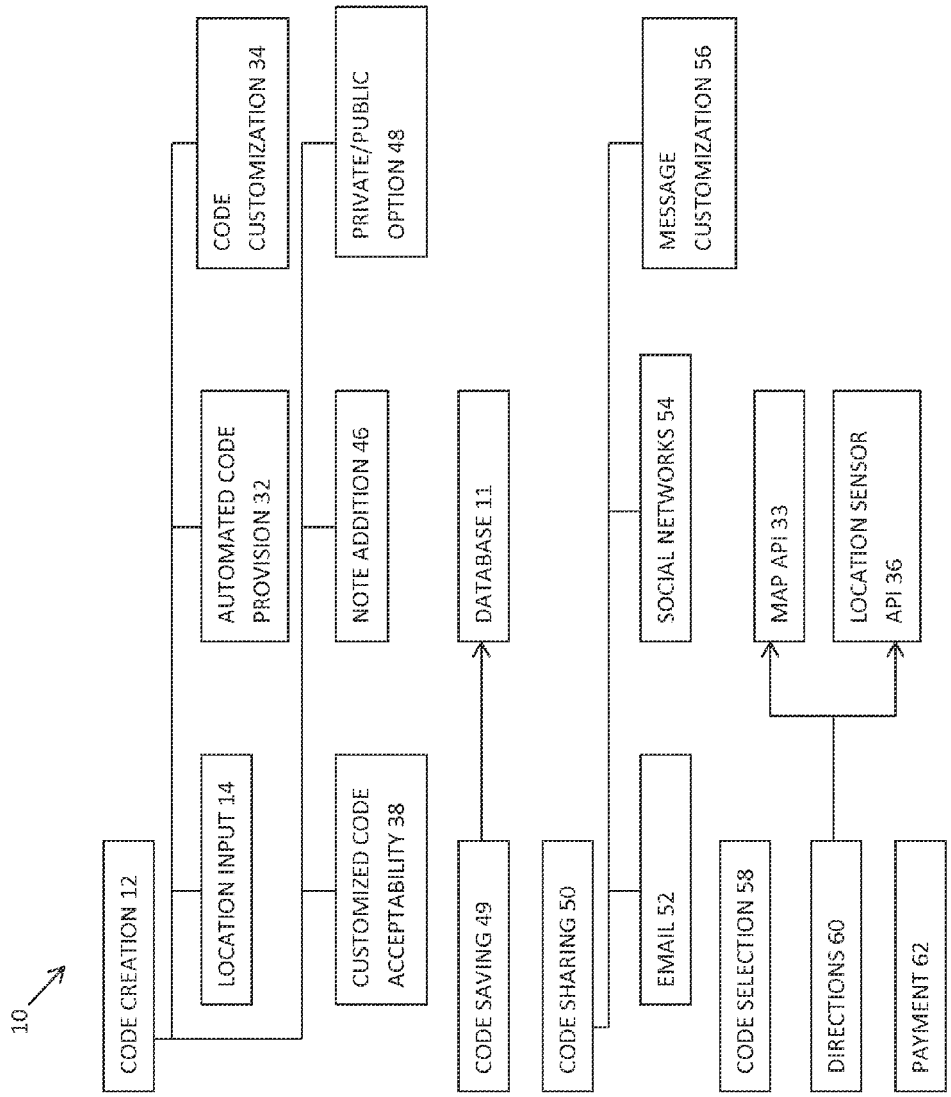
FIG. 1 is a block diagram showing the functionality of the software product of the present invention.

Referring to FIGS. 1 and 2, the features of location identification software product 10 are shown. Location identification software product 10 includes code creation software code 12, code saving software code 49, database 11, code sharing software code 50, code selection software code 58, directions software code 60, and payment software code 62.

Code creation software code 12 allows for the creation of a code or logo associated with a physical location. Code creation software code 12 includes location input software code 14, automated code provision software code 32, code customization software code 34, customized code acceptability software code 38, note addition software code 46, and public/private option software code 48. Location input software code 14 is detailed in FIG. 2 and allows for the input of the location to be coded. A location may be inputted by several means including typing an address 16, typing GPS coordinates 18, using current location 20, selecting a map location 22, searching for a location 24, typing a zip code+four 26, or plotting polygon points 28. For each example including the act of "typing" something for input, it is recognized that some devices, especially tablet computers and smartphones, may include voice recognition capabilities so that the input may not be through typing but through speaking to the device. For inputting options such as typing an address 16, typing GPS coordinates 18, selecting a map location 22, or plotting polygon points 28, a map application programming interface (API) 33, such as Google Maps® may be incorporated into code creation software code 12 an as to properly identify the location. For inputting options such as using current location 20, in which a user selects to code his current location, a location sensor API 36 and or map API 33 may be incorporated into code creation software code 12 so as to properly identify the location. For inputting options such as searching for a location 24, in which a user searches for a specific location, business, or address, and selects a search result for coding, a search engine API 40, such as the Google® search engine or Google Places® API, may be incorporated into code creation software code 12 so as to properly identify the location. For inputting options such as typing a zip code+four 26, a zip code API 42, such as the USPS zip code look-up, may be incorporated into code creation software code 12 on as to properly identify the location. Plotting polygon points 28 involves choosing to identify a shape on a map and selecting three or more points on that map and connecting them to plot the polygon. Plotting polygon points 28 is most useful for identifying a larger area than a specific point. Plotting polygon points 28 may be used to code the location of Disneyland or SOHO, for example. One of ordinary skill in the art will recognize that these are but a few examples of means for inputting a location and that there are many equivalent means for doing so, each of which is considered to be within the scope of the present invention.

Once the location is inputted, automated code provision software code 32 is executed. Automated code provision software code 32 provides the user with a code associated with the inputted location. The code is alphanumeric, but may also be displayed as a QR code or bar code. The code is easily speakable into a device that accepts spoken commands. The user may then choose to execute code customization software code 34 to choose a different alphanumeric code for the inputted location other than the one automatically generated by automated code provision software code 32. If code customization software code 34 is executed by the input of a requested alphanumeric customized code, customized code acceptability software code 38 is also executed. Customized code acceptability software code 38 checks for availability of the requested alphanumeric customized code, acceptability of the requested customized code as far as rules for the code, that it must contain at least one letter, one number, and one symbol, and whether the requested customized code is a code that has been reserved. Codes may be reserved for several reasons. A code containing a very desirable word, "pizza" for example, may be reserved for users willing to pay to have a code with that word. Codes containing trademarks may also be reserved. In embodiments where code creation 12 is for creation of a logo code associated with a location, code customization software code 34 allows the user to input their preferred logo input. Customized code acceptability software code 38 may then also be executed to verify that the user is the owner of the logo.

Once a user has been provided with an acceptable code through automated code provision software code 32 or has chosen a code through code customization software code 34 that has been deemed acceptable through customized code acceptability software code 38, the user may input notes associated with the code or the location it represents through note addition software code 46. Notes that may be associated with the code and/or location may be personal, such as "Meeting in back room," "Meet me here at 9 pm on Saturday," or "Come around to the back of the house." Alternatively, if the user is a business, the notes may include information it wishes to display about the business, such as menu items if the business is a restaurant, or brands sold if the business is a retail store. In addition, notes may include special deals or aspects of a business, such as "Sunday brunch available." For codes made public, these notes will be searchable with an internet search engine, so the notes may bring in business. If Summit Diner in Summit, N.J. has a code with a note attached including "Sunday brunch available," for example, and someone performs an internet search for "Summit N.J. Sunday brunch," then Summit Diner's code and attached notes will be among the search results. Public/private option software code 48 may also be executed, which allows a user to choose whether the code will be public or private. Using the examples above, if the user is sending a code with the "Meet me here at 9 pm on Saturday" note to his date, he will likely make the code private so that only his date will have access to the code. A business such as Summit Diner, on the other hand, will likely want their code and attached notes to be public so that anyone can find the restaurant and search for it on the internet as in the example given above.

In addition to code creation software code 12, location identification software product 10 includes saving software code 49 and database 11. Saving software code 49 is executed to save inputted location information through location input software code 14, any codes subsequently associated with that location through automated code provision software code 32 or code customization software code 34, any notes associated with the code and location through note addition software code 46, and whether the code and any notes are public or private as determined by the execution of public/private option software code 48. All of this information saved through saving software code 49 is saved in database 11.

Location identification software product 10 also includes code sharing software code 50. Code sharing software code 50 allows a user to share the code through various means such as email 52 or social media products 54, such as Twitter® or FaceBook®. If the user executes code sharing software code 50 through email 52 or social media products 54, the user may be prompted to log into the email 52 or social media 54 account if he is not already logged in. Message customization software code 56 may also be executed as a part of code sharing software code 50 to customize a message or post included with the code. The "Meet me here at 9 pm on Saturday" message, for example, may not be attached in the notes added to the code through note addition software code 46, but may instead by added as part of a Twitter® post through message customization software code 56.

Location identification software product 10 also includes code selection software code 58. Code selection software code 58 allows the recipient of a code shared through code sharing software code 50 to select the shared code and learn the location associated with the shared code and any other information attached to the code, such as notes associated with the code through note addition software code 46. Once the recipient has selected the shared code and been presented with the information, he may choose to execute directions software code 60. Directions software code 60 may use map 33 and/or location sensor 36 APIs to provide the recipient with directions to the coded location from the recipient's location or from another location provided by the recipient.

Location identification software product 10 also includes payment software code 62. Payment software code 62 allows for users to pay for the execution of code creation software code 12. One of ordinary skill in the art will recognize that there are many different payment structures for such a service as described above. Each of these variations is considered to be within the scope of the present invention. It is preferred, however, that code creation be free for both consumers and businesses for non-premium names. Premium code names, such as those including common and desirable words like "pizza," "coffee," "gas," or "lawyer" may he reserved and only assigned to a location upon payment. Premium code names may also include trademarks and trade names. Premium code names are included in database 11 and may be released for assignment only upon execution of payment software code 62.

One of ordinary skill in the art will recognize that location identification software product 10 and its features may be executed by any device including internet capabilities, including desktop, laptop, and tablet computers, as well as smartphones, which are mobile phones having computer capabilities beyond telephonic capabilities, especially including internet capabilities. It is preferable that the device also include GPS capabilities for improved accuracy.

Now referring to FIG. 3, functionality surrounding the possibility of using a symbol in combination with an alphanumeric code as a trigger, of sorts, is shown. A symbol may be included along with the alphanumeric code, where the combination of the symbol and alphanumeric code will be recognized by certain technologies, such as online social media, search, and mapping technologies. As discussed elsewhere herein, one general operation that the software product of the present invention causes the data processing device to perform is that of receiving an alphanumeric code input 70 into a device that is GPS-enabled and able to transmit information to and receive information from the data processing device, where the alphanumeric code was created by the software product and is associated with a location. With the use of the symbol, this general step includes several steps. It may include the steps of instructing online social media technology 72 to recognize 78 an input including the alphanumeric code in combination with the symbol; instructing the online social media technology 72 to make the input into a hyperlink 80; and receiving a selection of the hyperlink 88. Alternatively, it may include the steps of instructing search technology 74 to recognize 78 a search query including the alphanumeric code in combination with the symbol; instructing the online search technology 74 to include a link 82 associated with the database in the result set for that search query; and receiving a selection of the link 88. Alternatively, it may include the steps of instructing online mapping technology 76 to recognize 78 an input including the alphanumeric code in combination with the symbol; instructing the online mapping technology 76 to query that database 84 as to the location associated with the alphanumeric code; and receiving the query 86 from the online mapping technology.

Now referring to FIG. 4, a diagram showing communication between various components that perform the functions of the software product of the present invention is provided. Server 100 is the main data processing device that performs the software functions described herein. Server 100 includes GPS receiver 102 that provides server 100 with the capability to receive information from GPS Satellite 104. GPS Satellite 104 detects the location of device 106 and relays it to server 100. Device 106 is in communication with base transceiver station (BTS) 108. Server 100 is also in communication with BTS 108 through network 110. The user of device 106 can request that server 100 create a code based on the location of device 106. In addition, if the user of device enters a code and transmits it to server 100, server 100 may provide the user with directions to or from the encoded location based on the user's position as relayed through GPS satellite 104.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

The invention claimed is:

1. A software product tangibly stored on a non-transitory storage device comprising a database, the product configured to cause at least one data processing device to perform operations comprising:
   receiving a location input;
   receiving a preferred alphanumeric grouping;
   checking availability of the preferred alphanumeric grouping against a list of non-available alphanumeric codes;
   checking attributes of the preferred alphanumeric grouping against a set of rules for preferred alphanumeric codes;
   creating an alphanumeric code that is the preferred alphanumeric grouping and associated with the inputted location;
   including a symbol in a position proximate to the alphanumeric code;
   storing the inputted location, the alphanumeric code, the symbol, and the position of the symbol proximate to the alphanumeric code in said database on said non-transitory storage device;
   receiving an alphanumeric code input into a device that is GPS-enabled and able to transmit information to and receive information from said at least one data processing device, wherein the alphanumeric code was created by said software product and is associated with a location;
   providing the location associated with the alphanumeric code;
   receiving a second location by detecting a location of the GPS-enabled device; and
   transmitting to the GPS-enabled device directions from the location of GPS-enabled device to the location associated with the alphanumeric code.

2. The software product as claimed in claim 1, wherein the symbol proximate to the alphanumeric code is disposed immediately preceding the alphanumeric code.

3. The software product as claimed in claim 1, wherein the symbol proximate to the alphanumeric code is disposed immediately following the alphanumeric code.

4. The software product as claimed in claim 1, wherein the symbol proximate to the alphanumeric code is disposed between characters included in the alphanumeric code.

5. The software product as claimed in claim 1, wherein said step of receiving an alphanumeric code input into a device that is GPS-enabled and able to transmit information to and receive information from said at east one data processing device comprises the steps of:
   sending online social media technologies instructions to:
      recognize an input including the alphanumeric code and the symbol proximate to the alphanumeric code; and
      make the input into a hyperlink, wherein the hyperlink is associated with said database of said non-transitory storage device; and
   receiving a selection of the hyperlink.

6. The software product as claimed in claim 5, wherein said step of receiving a location input comprising receiving a location input of a product.

7. The software product as claimed in claim 6, wherein:
   said step of receiving a location input comprises receiving a set of at least two locations; and
   said step of providing the location associated with the alphanumeric code comprises the step of providing at least two of the locations included in the set of locations associated with the alphanumeric code in ascending order of distance from the location of the GPS-enabled device.

8. The software product as claimed in claim 1, wherein said step of receiving an alphanumeric code input into a device that is GPS-enabled and able to transmit information to and receive information from said at least one data processing device comprises the steps of:
   sending online search technologies instructions to:
      recognize a search query including the alphanumeric code and the symbol proximate to the alphanumeric code; and
      include a link associated with said database of said non-transitory storage device within a result set of the search query; and
   receiving a selection of the link.

9. The software product as claimed in claim 8, wherein said step of sending online search technologies instructions to include a link associated with said database of said non-transitory storage device within the result set of the search query comprises sending online search technologies instructions to include a link associated with said database of said non-transitory storage device within the result set of the search query as a first listed link within the result set of the search query.

10. The software product as claimed in claim 8, wherein said step of receiving a location input comprising receiving a location input of a product.

11. The software product as claimed in claim 8, wherein:
   said step of receiving a location input comprises receiving a set of at least two locations; and said step of providing the location associated with the alphanumeric code comprises the step of providing at least two of the locations included in the set of locations associated with the alphanumeric code in ascending order of distance from the location of the GPS-enabled device.

12. The software product as claimed in claim 1, wherein said step of receiving an alphanumeric code input into a device that is GPS-enabled and able to transmit information to and receive information from said at least one data processing device comprises the steps of:
sending online mapping technologies instructions to:
recognize an input including the alphanumeric code and the symbol proximate to the alphanumeric code; and
query said database as to the location associated with the inputted alphanumeric code; and
receiving the query from the online mapping technology.

13. The software product claimed in claim 12, wherein said step of receiving a location input comprising receiving a location input of a product.

14. The software product as claimed in claim 12, wherein:
said step of receiving a location input comprises receiving a set of at least two locations; and
said step of providing the location associated with the alphanumeric code comprises the step of providing at least two of the locations included in the set of locations associated with the alphanumeric code in ascending order of distance from the location of the GPS-enabled device.

15. A software product tangibly stored on a non-transitory storage device comprising a database, said product configured to cause at least one data processing device to perform operations comprising:
receiving a location input;
creating a QR code associated with the inputted location;
receiving a scan of a QR code from a device that is GPS-enabled, able to scan QR codes, and able to transmit information to and receive information from said data processing device, wherein the QR code was created by said software product;
providing the location associated with the QR code;
receiving a second location by detecting a location of the GPS-enabled device; and
transmitting to the GPS-enabled device directions from the location of the GPS-enabled device to the location associated with the QR code.

16. A software product tangibly stored on a non-transitory storage device comprising a database, said product configured to cause at least one data processing device to perform operations comprising:
receiving a location input;
receiving a logo input;
associating the location input with the logo input within said database;
storing the associated location input and logo input within said database;
receiving an image scanned into a device that is GPS-enabled and able to transmit information to and receive information from said at least one data processing device;
analyzing the scanned image to determine that it is sufficiently similar to a logo input stored in said database to identify the scanned image as the logo input, wherein the logo input was stored in said database in said step of storing the associated location input and logo input within said database;
providing the location associated with the logo;
receiving a second location by detecting a location of the GPS-enabled device; and
transmitting to the GPS-enabled device directions from the location of the GPS enabled device to the location associated with the logo input.

17. The software product claimed in claim 16, further comprising the operations of:
searching for additional images associated with the logo input; and
storing the additional images in said database as the logo input.

18. The software product as claimed in claim 16, further comprising the operation of verifying an availability of the received logo input.

19. The software product as claimed in claim 16, wherein said step of receiving a location input comprising receiving a location input of a product.

20. The software product as claimed in claim 16, wherein:
said step of receiving a location input comprises receiving a set of at least two locations; and
said step of providing the location associated with the logo comprises the step of providing at least two of the locations included in the set of locations associated with the logo input in ascending order of distance from the location of the GPS-enabled device.

21. The software product claimed in claim 16, wherein said step of transmitting to the device directions from the location of the GPS-enabled device to the location associated with the logo comprises the steps of:
transmitting an electronic map to the device, comprising the steps of:
transmitting the location associated with the logo input;
transmitting the location of the device with a dot that turns a first color when the device moves closer to the location associated with the logo input and turns a second color when the device moves farther away from the location associated with the logo input; and
transmitting directions between the two locations.

* * * * *